United States Patent
Huang

(10) Patent No.: US 9,702,234 B2
(45) Date of Patent: Jul. 11, 2017

(54) FOAMERS FOR LIQUID REMOVAL

(71) Applicant: Ecolab USA Inc., Naperville, IL (US)

(72) Inventor: Fenfen Huang, Sugar Land, TX (US)

(73) Assignee: ECOLAB USA INC., Naperville, IL (US)

( * ) Notice: Subject to any disclaimer, the term of this patent is extended or adjusted under 35 U.S.C. 154(b) by 443 days.

(21) Appl. No.: 14/197,870

(22) Filed: Mar. 5, 2014

(65) Prior Publication Data

US 2014/0262297 A1    Sep. 18, 2014

Related U.S. Application Data

(60) Provisional application No. 61/780,303, filed on Mar. 13, 2013.

(51) Int. Cl.
| | |
|---|---|
| *E21B 43/16* | (2006.01) |
| *C10G 21/27* | (2006.01) |
| *C09K 8/584* | (2006.01) |
| *C09K 8/594* | (2006.01) |

(52) U.S. Cl.
CPC .............. *E21B 43/16* (2013.01); *C09K 8/584* (2013.01); *C09K 8/594* (2013.01); *C10G 21/27* (2013.01); *C09K 2208/22* (2013.01)

(58) Field of Classification Search
CPC ..... E21B 43/16; C09K 8/594; C09K 2208/22; C10G 21/27
USPC ........... 166/305.1, 250.01, 300, 308.1, 308.2
See application file for complete search history.

(56) References Cited

U.S. PATENT DOCUMENTS

| | | | |
|---|---|---|---|
| 3,818,074 A | 6/1974 | Ahlbrecht | |
| 5,714,266 A * | 2/1998 | Harrison | D21H 17/06 106/18.14 |
| 7,122,509 B2 | 10/2006 | Sanner et al. | |
| 7,311,144 B2 | 12/2007 | Conrad | |
| 7,385,077 B1 * | 6/2008 | Acosta | B01F 17/0035 106/287.24 |
| 7,422,064 B1 | 9/2008 | Yang | |
| 2005/0043206 A1 | 2/2005 | Munoz, Jr. et al. | |
| 2005/0129626 A1 * | 6/2005 | Koivisto | A01N 31/02 424/47 |
| 2005/0137114 A1 * | 6/2005 | Gatlin | C09K 8/38 510/424 |
| 2006/0128990 A1 | 6/2006 | Davis et al. | |
| 2007/0027055 A1 * | 2/2007 | Koivisto | A01N 31/02 510/383 |
| 2007/0079963 A1 | 4/2007 | Yang et al. | |
| 2007/0118101 A1 | 5/2007 | Mahesh et al. | |
| 2007/0148101 A1 * | 6/2007 | Snyder | C11D 1/008 424/47 |
| 2008/0207767 A1 | 8/2008 | Dobos et al. | |
| 2009/0131283 A1 | 5/2009 | Nguyen et al. | |
| 2010/0292110 A1 | 11/2010 | Pope et al. | |
| 2011/0104079 A1 | 5/2011 | Snyder et al. | |
| 2012/0279715 A1 | 11/2012 | Nguyen et al. | |

FOREIGN PATENT DOCUMENTS

| | | |
|---|---|---|
| CN | 102140338 A | 8/2011 |
| EP | 0 430 579 A2 | 6/1991 |
| EP | 1811013 A1 | 7/2007 |
| WO | WO 92/14907 | 9/1992 |

OTHER PUBLICATIONS

Wang, Yaling et al.; "Effects of Low Carbon Alcohols on Foaming Capability of Mixed Systems of Fluorocarbon and Hydrocarbon Surfactants;" *Chemical Industry and Engineering Society of China Journal*; May 2010; 7p; vol. 61, No. 5; CN.

International Search Report and the Written Opinion from corresponding PCT Appln. No. PCT/US2014/020691 dated Jun. 26, 2014 (10 pgs).

* cited by examiner

*Primary Examiner* — Silvana Runyan
(74) *Attorney, Agent, or Firm* — Eric D. Babych; Brinks Gilson & Lione

(57) ABSTRACT

Disclosed herein are methods of recovering a low molecular weight alcohol or alcohol containing fluid in natural gas and oil production and transmission. Disclosed herein are also methods of recovering hydrocarbon fluid from a well, using fluids comprising an effective foam-forming amount of a fluorosurfactant compound.

20 Claims, No Drawings

FOAMERS FOR LIQUID REMOVAL

CROSS-REFERENCE TO RELATED APPLICATIONS

This application claims priority from U.S. Provisional Application No. 61/780,303, filed Mar. 13, 2013, the entire contents of which are hereby incorporated by reference.

TECHNICAL FIELD

The present disclosure is directed to methods of removing low molecular weight alcohols or alcohol-containing fluids from wellbores and pipelines during oil and gas production and transportation.

BACKGROUND

Liquid loading is a widely encountered phenomenon in both natural gas well production and wet gas transmission pipelines in the oil and gas industry. The low flow-rate operation of gas/condensate pipelines can lead to significant liquid accumulation due to gravity or vapor condensation, coupled with the undulating trajectory of the gas transport pipeline. For offshore operations, if produced water or condensed water is present, hydrate formation is a challenge that operators may have to face as well if water-containing liquid accumulation is not remedied properly.

Hydrate inhibitors, including low molecular weight alcohols such as methanol and ethanol, are often used to prevent hydrate formation in transmission pipelines. However, if not applied and optimized in a proper manner, the alcohols may accumulate in low spots in the undulating gas transport pipeline. Similarly, large amounts of alcohol-containing oil field chemicals, such as corrosion inhibitors, could also pose liquid accumulation challenges in both the production and transmission systems if not applied and optimized via an effective approach. Alcohol or alcohol contaminated liquid accumulation can not only restrict the production or transportation, but also can lead to undesired outcomes such as increased corrosion.

There is therefore a need to for effective and efficient removal of low molecular weight alcohols or alcohol contaminated fluids from wellbore or gas pipeline to optimize oil and gas production.

SUMMARY

In one aspect, the disclosure is directed to a method of removing a low molecular weight alcohol or alcohol-containing fluid during oil or gas production, comprising:

introducing into a wellbore or a pipeline composition comprising an effective amount of a compound of formula (I):

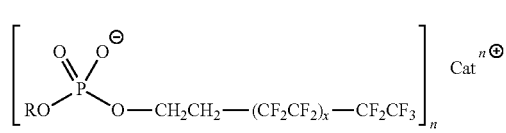

wherein:
R is hydrogen or —CH$_2$CH$_2$—(CF$_2$CF$_2$)$_x$—CF$_2$CF$_3$;
each x is independently an integer from 1 to 50;
n is 1 or 2;
Cat is a cation selected from the group consisting of betaine, N(R$^a$)$_4\oplus$, an alkali metal cation and an alkaline earth metal cation; and
each R$^a$ is independently hydrogen or optionally substituted C$_1$-C$_6$ alkyl.

In some embodiments, R is hydrogen. In some embodiments, R is —CH$_2$CH$_2$—(CF$_2$CF$_2$)$_x$—CF$_2$CF$_3$. In some embodiments, each x is independently from 8 to 18. In some embodiments, n is 1 and Cat is selected from the group consisting of betaine, Na$^+$, K$^+$, NH$_4^+$, NH$_2$(CH$_2$CH$_3$)$_2^+$, NH(CH$_2$CH$_3$)$_3^+$, and NH$_2$(CH$_2$CH$_2$OH)$_2^+$. In some embodiments, n is 2 and Cat is Ca$^{2+}$. In some embodiments, the composition further comprises a solvent. In some embodiments, the solvent is selected from the group consisting of water, a C$_1$-C$_6$ alcohol, a glycol, a glycol ether and xylenes or the like. In some embodiments, the composition further comprises an additive selected from the group consisting of corrosion inhibitors, scale inhibitors, biocides, paraffin dispersants and emulsion breakers. In some embodiments, the composition further comprises a surfactant selected from the group consisting of siloxanes, sulfobetaine fluorocarbons, amine oxide fluorocarbons, ethoxylated nonylphenol type fluorocarbons, ethoxylated alcohol type fluorocarbons, fluoropolymers, betaines, amine oxides, ethoxylated nonylphenols, ethoxylated alcohol olefin sulfonates and ether sulfonates. In some embodiments, the composition comprises about 10 ppm to about 100,000 ppm of the compound of formula (I). In some embodiments, the method further comprises introducing the composition into the wellbore or pipeline as batch addition. In some embodiments, the method further comprises continuously introducing the composition into the wellbore or pipeline.

In another aspect, the disclosure is directed to a method of recovering a hydrocarbon fluid from a well, comprising:

introducing into the well a composition comprising an effective foam-forming amount of a compound of formula (I):

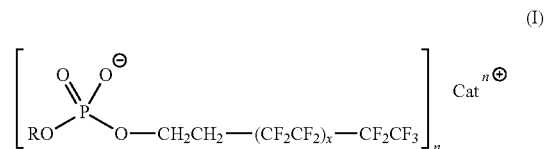

wherein:
R is hydrogen or —CH$_2$CH$_2$—(CF$_2$CF$_2$)$_x$—CF$_2$CF$_3$;
each x is independently an integer from 1 to 50;
n is 1 or 2;
Cat is a cation selected from the group consisting of betaine, N(R$^a$)$_4\oplus$, an alkali metal cation and an alkaline earth metal cation; and
each R$^a$ is independently hydrogen or optionally substituted C$_1$-C$_6$ alkyl.

In some embodiments, the hydrocarbon fluid is a naturally present liquid in a gas well. In some embodiments, further comprising recovering a gas from the gas well. In some embodiments, the hydrocarbon fluid is crude oil and the well is a gas-lifted oil well.

DETAILED DESCRIPTION

The present disclosure is directed to methods for removing low molecular-weight alcohols or alcohol containing fluids during oil and/or gas production, e.g., from a wellbore or a pipeline. The methods comprise introducing into a wellbore or a pipeline an effective amount of an anionic fluorosurfactant compound, such as a compound of formula (I) described herein. The anionic fluorosurfactant compounds that may be used in the methods are soluble in methanol, and may outperform cationic and nonionic fluorosurfactants as well as other foamers and surfactants in methanol unloading from a wellbore or a pipeline.

The disclosure is also further directed to a method for recovering a hydrocarbon fluid from a well, comprising introducing into the well a composition comprising an effective foam-forming amount of an anionic fluorosurfactant compound, such as compounds having formula (I) described herein.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

The term "alkyl," as used herein, refers to a linear or branched hydrocarbon radical, preferably having 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons. Alkyl groups include, but are not limited to, methyl, ethyl, n-propyl, isopropyl, n-butyl, iso-butyl, sec-butyl, and tert-butyl. Alkyl groups may be unsubstituted or substituted by one or more suitable substituents, as defined below.

The term "hydrocarbon fluid," as used herein, refers to an organic compound consisting entirely of hydrogen and carbon. Hydrocarbons may be aromatic hydrocarbons (arenes), alkanes, alkenes, cycloalkanes and alkyne-based compounds. The majority of hydrocarbons found naturally occur in crude oil, where decomposed organic matter provides an abundance of carbon and hydrogen which, when bonded, can catenate to form seemingly limitless chains. Hydrocarbons may be saturated hydrocarbons (alkanes) composed entirely of single bonds and are saturated with hydrogen. The general formula for saturated hydrocarbons is $C_nH_{2n+2}$ (assuming non-cyclic structures). Saturated hydrocarbons are the basis of petroleum fuels and are found as either linear or branched species. Hydrocarbons with the same molecular formula, but different structural formulae are called structural isomers. As given in the example of 3-methylhexane and its higher homologues, branched hydrocarbons can be chiral. Chiral saturated hydrocarbons constitute the side chains of biomolecules such as chlorophyll and tocopherol. Hydrocarbons may be unsaturated hydrocarbons having one or more double or triple bonds between carbon atoms such as alkenes and alkynes as defined above. Hydrocarbons may be cycloalkanes, which are hydrocarbons containing one or more carbon rings to which hydrogen atoms are attached. Hydrocarbons may be aromatic hydrocarbons, also known as arenes, are hydrocarbons that have at least one aromatic ring. Hydrocarbons may be gases (e.g. methane and propane), liquids (e.g. hexane and benzene), waxes or low melting solids (e.g. paraffin wax and naphthalene) or polymers (e.g. polyethylene, polypropylene and polystyrene). Hydrocarbons may be a liquid hydrocarbon. The liquid hydrocarbon may be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene.

The term "alcohol" refers to any of a class of organic compounds characterized by one or more hydroxyl (—OH) groups attached to a carbon atom of an alkyl group (hydrocarbon chain).

The term "low molecular weight alcohol," includes but is not limited to alcohols, such as $C_1$-$C_4$ alcohols, methanol, ethanol, n-propanol, iso-propanol, n-butanol, sec-butanol, iso-butanol and tert-butanol, in addition to glycols, such as Monoethylene Glycol, diethylene glycol, triethylene glycol, and the like.

The term "substituent," as used herein, is intended to mean a chemically acceptable functional group that is "substituted" at any suitable atom of that group. Suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, HO—(C=O)— groups, heterocyclic groups, cycloalkyl groups, amino groups, alkyl- and dialkyl-amino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups, groups of formula —$(OCH_2)_t$OH wherein t is 1 to 25, and groups of formula-alkylenyl-$(OCH_2)_t$OH wherein t is 1 to 25. Those skilled in the art will appreciate that many substituents can be substituted with additional substituents.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. METHODS FOR REMOVING ALCOHOLS OR ALCOHOL CONTAINING FLUIDS

The present disclosure is directed to a method for removing a low molecular weight alcohol or alcohol containing liquid during oil and gas production. The methods comprise the step of introducing into a wellbore or pipeline a composition comprising an effective amount of an anionic fluorosurfactant compound into the wellbore or pipeline, a compound having formula (I) described herein.

Low molecular weight alcohols may be added to fluids used in oil and gas recovery, for example, to inhibit hydrate formation. While effective for inhibiting hydrates, alcohols and alcohol-contaminated liquids can restrict production and/or transport of fluids, and also can result in increased levels of corrosion. Therefore, a compound that is effective in foaming low molecular weight alcohols may be useful in such contexts, and may further facilitate eventual removal of the alcohols from the fluids. The methods described herein provide effective and efficient removal of the alcohol, which maximize production and reduce corrosion.

The composition comprising the effective amount of the anionic fluorosurfactant compound can be applied by batch treatments or continuous applications via the casing/tubing annulus or via capillary strings, and may introduced into the downhole end of a well. An exemplary method and apparatus of introducing foamers through the use of an injection nozzle capable of atomizing the foamer is disclosed in U.S. Pat. No. 7,311,144, which is hereby fully incorporated by reference. A batch treatment involves the application of a single volume of foamer to the well or pipeline, as opposed to a smaller volume applied continuously for the case of a continuous application. The next batch can be applied after a period of time when the compound starts to lose its effectiveness or decline in performance.

Additional methods include methods of recovering gas and fluids from a gas well, and methods of recovering oil from a gas-lifted oil well penetrating a subterranean oil-bearing formation, comprising addition to the well a composition comprising an effective amount of an anionic fluorosurfactant compound, such as a compound of formula (I). Such methods may further comprise the step of recovering the hydrocarbon fluid from the well (e.g., the gas well or the gas-lifted oil well). In some embodiments, the hydrocarbon fluid may be displaced in to one or more production vessels, such as pipelines, tanks, ships, floating production storage and offloading units (FPSOs), floating storage and offloading units (FSOs), or any unit that can transport or store a hydrocarbon fluid such as oil or natural gas.

a. Anionic Fluorosurfactants

The methods comprise introducing into a wellbore or a pipeline a composition comprising an effective amount a compound of formula (I):

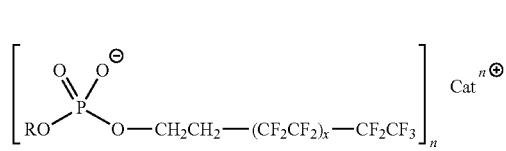

(I)

wherein:
R is hydrogen or $-CH_2CH_2-(CF_2CF_2)_x-CF_2CF_3$;
each x is independently an integer from 1 to 50;
n is 1 or 2;
Cat is a cation selected from the group consisting of betaine, $N(R^a)_4 \oplus$, an alkali metal cation and an alkaline earth metal cation; and
each $R^a$ is independently hydrogen or optionally substituted $C_1$-$C_6$ alkyl.

In some embodiments, R is hydrogen. In some embodiments, R is $-CH_2CH_2-(CF_2CF_2)_x-CF_2CF_3$.

In some embodiments, x is an integer from 1 to 50, from 4 to 24, or from 8 to 18. For example, x may be 4, 5, 6, 7, 8, 9, 10, 11, 12, 13, 14, 15, 16, 17, 18, 19, 20, 21, 22, 23 or 24.

In some embodiments, n is 1. In such embodiments, Cat is a monovalent cation. For example, Cat may be an alkali metal cation such as $Na^+$ or $K^+$. In other embodiments, Cat may be a monovalent ammonium cation $N(R^a)_4^+$, wherein each $R^a$ is independently hydrogen or optionally substituted $C_1$-$C_6$ alkyl. In other embodiment, Cat may be betaine. In another embodiment, n is 2, and Cat is an alkaline earth metal cation such as $Ca^{2+}$. For example, each $R^a$ may be independently hydrogen methyl, ethyl, n-propyl, isopropyl, or n-butyl. In embodiments in which $R^a$ is an optionally substituted $C_1$-$C_6$ alkyl, $R^a$ may be a hydroxyalkyl (e.g., $-CH_2OH$, $-CH_2CH_2OH$, $-CH_2CH_2CH_2OH$, or the like). Exemplary monovalent ammonium cations include, for example, $NH_2(CH_2CH_3)_2^+$, $NH(CH_2CH_3)_3^+$, and $NH_2(CH_2CH_2OH)_2^+$.

Compounds of formula (I) can be prepared by any means known in the art. For example, a compound could be prepared by addition of a fluoroaliphatic sulfonyl chloride or bromide, or a perfluoroaliphatic iodide compound, to a terminally unsaturated phosphate ester compound at a desired mole ratio, followed by neutralization (e.g., with an amine such as diethylamine, triethylamine, or diethanolamine). The preparation of fluoroaliphatic-substituted esters is disclosed, for example, in U.S. Pat. No. 3,818,074 and EP 0430579A2, each of which is hereby fully incorporated by reference.

The compound of formula (I) may be included in the composition in an amount of about 10 ppm to about 100,000 ppm, e.g., around 100 ppm to about 10,000 ppm, or about 200 ppm to about 5,000 ppm. For example, the compound of formula (I) may be included in the composition in an amount of about 10 ppm, 20 ppm, 30 ppm, 40 ppm, 50 ppm, 60 ppm, 70 ppm, 80 ppm, 90 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 1100 ppm, 1200 ppm, 1300 ppm, 1400 ppm, 1500 ppm, 1600 ppm, 1700 ppm, 1800 ppm, 1900 ppm, 2000 ppm, 2100 ppm, 2200 ppm, 2300 ppm, 2400 ppm, 2500 ppm, 2600 ppm, 2700 ppm, 2800 ppm, 2900 ppm, 3000 ppm, 3100 ppm, 3200 ppm, 3300 ppm, 3400 ppm, 3500 ppm, 3600 ppm, 3700 ppm, 3800 ppm, 3900 ppm, 4000 ppm, 4100 ppm, 4200 ppm, 4300 ppm, 4400 ppm, 4500 ppm, 4600 ppm, 4700 ppm, 4800 ppm, 4900 ppm, 5000 ppm, 5500 ppm, 6000 ppm, 6500 ppm, 7000 ppm, 7500 ppm, 8000 ppm, 8500 ppm, 9000 ppm, 9500 ppm, 10000 ppm, 11000 ppm, 12000 ppm, 13000 ppm, 14000 ppm, 15000 ppm, 16000 ppm, 17000 ppm, 18000 ppm, 19000 ppm, 20000 ppm, 21000 ppm, 22000 ppm, 23000 ppm, 24000 ppm, 25000 ppm, 26000 ppm, 27000 ppm, 28000 ppm, 29000 ppm, 30000 ppm, 31000 ppm, 32000 ppm, 33000 ppm, 34000 ppm, 35000 ppm, 36000 ppm, 37000 ppm, 38000 ppm, 39000 ppm, 40000 ppm, 41000 ppm, 42000 ppm, 43000 ppm, 44000 ppm, 45000 ppm, 46000 ppm, 47000 ppm, 48000 ppm, 49000 ppm, 50000 ppm, 51000 ppm, 52000 ppm, 53000 ppm, 54000 ppm, 55000 ppm, 56000 ppm, 57000 ppm, 58000 ppm, 59000 ppm, 60000 ppm, 61000 ppm, 62000 ppm, 63000 ppm, 64000 ppm, 65000 ppm, 66000 ppm, 67000 ppm, 68000 ppm, 69000 ppm, 70000 ppm, 71000 ppm, 72000 ppm, 73000 ppm, 74000 ppm, 75000 ppm, 76000 ppm, 77000 ppm, 78000 ppm, 79000 ppm, 80000 ppm, 81000 ppm, 82000 ppm, 83000 ppm, 84000 ppm, 85000 ppm, 86000 ppm, 87000 ppm, 88000 ppm, 89000 ppm, 90000 ppm, 91000 ppm, 92000 ppm, 93000 ppm, 94000 ppm, 95000 ppm, 96000 ppm, 97000 ppm, 98000 ppm, 99000 ppm, or 100000 ppm.

b. Additional Components

In addition to the compound of formula (I), the composition may further optionally include one or more additives. Suitable additives include, but are not limited to, solvents, corrosion inhibitors, scale inhibitors, emulsifiers, water clarifiers, dispersants, emulsion breakers, hydrogen sulfide scavengers, gas hydrate inhibitors, biocides, pH modifiers, surfactants, synergistic compounds, asphaltene inhibitors, paraffin inhibitors, and antioxidants.

(1) Solvents

The composition may further comprise a solvent. A solvent may reduce the viscosity, enhance the liquid unloading efficiency, lower the freezing point of the foamer, and/or improve compatibility with other components of the composition. Suitable solvents include, but are not limited to, water, isopropanol, methanol, ethanol, 2-ethylhexanol, heavy aromatic naphtha, toluene, ethylene glycol, ethylene glycol monobutyl ether (EGMBE), diethylene glycol monoethyl ether, and xylene. Representative polar solvents suitable for formulation with the composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (ethylene glycol, 1,2-propylene glycol, 1,3-propylene glycol, ethylene glycol monobutyl ether, etc.), ketones (cyclohexanone, diisobutylketone), N-methylpyrrolidinone (NMP), N,N-dimethylformamide and the like. Representative of non-polar solvents suitable for formulation with the composition include aliphatics such as pentane, hexane, cyclohexane, methylcyclohexane, heptane, decane, dodecane, diesel, and the like; aromatics such as toluene, xylenes, heavy aromatic naphtha, fatty acid derivatives (acids, esters, amides), and the like.

In certain embodiments, the solvent is water, an alcohol, a glycol, a glycol ether, xylenes, or a combination thereof.

In certain embodiments, a composition of the invention comprises from 0 to about 99 percent by weight of one or more solvents, based on the weight of the composition. In certain embodiments, a composition of the invention comprises from about 5 to about 99, from about 5 to about 95, or from about 5 to about 70% by weight of one or more solvents, based on the weight of the composition. In certain embodiments, a composition of the invention comprises 20%, 25%, 30%, 35%, 40%, 45%, 50%, 55%, 60%, 65%, 70%, 75%, 80%, 85%, 90%, 95% or 99% by weight of one or more solvents, based on the weight of the composition.

(2) Corrosion Inhibitors

The composition may further comprise a corrosion inhibitor. Suitable corrosion inhibitors include, but are not limited to, amidoamines, quaternary amines, amides, and phosphate esters.

(3) Scale Inhibitors

The composition may further comprise a scale inhibitor. Suitable scale inhibitors include, but are not limited to, phosphates, phosphate esters, phosphoric acids, phosphonates, phosphonic acids, polyacrylamides, salts of acrylamido-methyl propane sulfonate/acrylic acid copolymer (AMPS/AA), phosphinated maleic copolymer (PHOS/MA), and salts of a polymaleic acid/acrylic acid/acrylamido-methyl propane sulfonate terpolymer (PMA/AMPS).

(4) Emulsifiers

The composition may further comprise an emulsifier. Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

(5) Water Clarifiers

The composition may further comprise a water clarifier. Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

(6) Dispersants

The composition may further comprise a dispersant. Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different. Other suitable dispersion agents include lignin or derivatives of lignin such as lignosulfonate and naphthalene sulfonic acid and derivatives.

(7) Emulsion Breakers

The composition may further comprise an emulsion breaker. Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, and resins, such as phenolic and epoxide resins.

(8) Hydrogen Sulfide Scavengers

The composition may further comprise a hydrogen sulfide scavenger. Suitable additional hydrogen sulfide scavengers include, but are not limited to, oxidants (e.g., inorganic peroxides such as sodium peroxide, or chlorine dioxide), aldehydes (e.g., of 1-10 carbons such as formaldehyde or glutaraldehyde or (meth)acrolein), triazines (e.g., monoethanol amine triazine, and monomethylamine triazine), and glyoxal. In certain embodiments, blending the compounds and compositions of the invention with MMA triazines lowers or eliminates offensive MMA odors.

(9) Gas Hydrate Inhibitors

The composition may further comprise a gas hydrate inhibitor. Suitable gas hydrate inhibitors include, but are not limited to, thermodynamic inhibitors (THI), kinetic inhibitors (KHI), and anti-agglomerates (AA). Suitable thermodynamic inhibitors include, but are not limited to, NaCl salt, KCl salt, $CaCl_2$ salt, $MgCl_2$ salt, $NaBr_2$ salt, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol), methanol, propanol, ethanol, glycol ethers (such as diethyleneglycol monomethyl ether, ethylene glycol monobutyl ether), and alkyl or cyclic esters of alcohols (such as ethyl lactate, butyl lactate, methylethyl benzoate). Suitable kinetic inhibitors and anti-agglomerates include, but are not limited to, polymers and copolymers, polysaccharides (such as hydroxy-ethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

(10) Biocides

The composition may further comprise a biocide. Any biocide suitable in oilfield operations may be used. A biocide may be included in a composition in an amount of about 0.1 ppm to about 1000 ppm, e.g., 0.1 ppm, 0.5 ppm, 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, or 1000 ppm.

Suitable biocides include, but are not limited to, oxidizing and non-oxidizing biocides. Suitable non-oxidizing biocides include, for example amine-type compounds (e.g., quaternary amine compounds and cocodiamine), halogenated compounds (e.g., bronopol and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

(11) pH Modifiers

The composition may further comprise a pH modifier. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include NaOH, KOH, $Ca(OH)_2$, CaO, $Na_2CO_3$, $KHCO_3$, $K_2CO_3$, $NaHCO_3$, MgO, and $Mg(OH)_2$.

(12) Surfactants

The composition may further comprise a surfactant. The surfactant may be a cationic surfactant, an anionic surfactant, an amphoteric surfactant, a zwitterionic surfactant or a non-ionic surfactant. In some embodiments, a surfactant may aid in improving the recovery of oil from the formation. A surfactant may be included in an composition in an amount of about 100 ppm to about 10000 ppm, e.g., 100 ppm, 200 ppm, 300 ppm, 400 ppm, 500 ppm, 600 ppm, 700 ppm, 800 ppm, 900 ppm, 1000 ppm, 2000 ppm, 3000 ppm, 4000 ppm, 5000 ppm, 6000 ppm, 7000 ppm, 8000 ppm, 9000 ppm, or 10000 ppm.

Suitable surfactants include, but are not limited to, anionic surfactants, cationic surfactants, and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono- and dialkyl sulfosuccinates and sulfosuccinamates. Suitable anionic surfactants include alkyl or alkyl ether sulfates and sulfonates, such as $C_{14}$-$C_{24}$ alpha olefin sulfonates, $C_{13}$-$C_{18}$ alcohol ether sulfates, $C_{15}$-$C_{17}$ internal olefin sulfonates, and $C_{12}$-$C_{18}$ ester sulfonates. Cationic surfactants include alkyl trimethyl quaternary ammonium salts, alkyl dimethyl benzyl quaternary ammonium salts, dialkyl dimethyl quaternary ammonium salts, and imidazolinium salts. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkyliminodipropionate.

For example, suitable surfactants can be any of the following: siloxanes, sulfobetaine fluorocarbons, amine oxide fluorocarbons, ethoxylated nonylphenol type fluorocarbons, ethoxylated alcohol type fluorocarbons, fluoropolymers, betaines, amine oxides, ethoxylated nonylphenols, ethoxylated alcohol olefin sulfonates and ether sulfonates.

(13) Synergistic Compounds

The composition may further comprise a synergistic compound. Suitable synergistic compounds include compounds that enhance the hydrogen sulfide scavenging performance of the composition. In certain embodiments, the synergistic compound may be a quaternary ammonium compound, an amine oxide, an ionic or non-ionic surfactant, or any combination thereof. Suitable quaternary amine compounds include, but are not limited to, alkyl benzyl ammonium chloride, benzyl cocoalkyl($C_{12}$-$C_{18}$)dimethylammonium chloride, dicocoalkyl($C_{12}$-$C_{18}$)dimethylammonium chloride, ditallow dimethylammonium chloride, di(hydrogenated tallow alkyl)dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhyexyl)dimethyl quaternary ammonium methyl sulfate. Suitable amine oxide compounds include, but are not limited to, fatty amine oxides such as stearyl dimethylamine oxide, lauryldimethylamine oxide, and cocamidopropylamine oxide, or etheramine oxides such as bis-(2-hydroxyethyl) isodecyloxypropylamine oxide. Suitable nonionic surfactants include, but are not limited to, polyoxyethylene glycol alkyl ethers, polyoxypropyleneglycol alkyl ethers, polyoxyethyleneglycol nonylphenol ethers, poloxamers, cocamide diethanolamine, and polyethoxylated tallow amine.

The synergist compound(s) may be present from about 0.01 to about 20 percent by weight. In certain embodiments, the synergistic compound is present from about 1 to about 10 percent by weight, from about 2 to about 9 percent by weight, from about 3 percent to about 8 percent by weight, from about 4 percent to about 7 percent by weight, or from about 5 percent to about 6 percent by weight. In certain embodiments, the synergist compound(s) may be added to a fluid or gas simultaneously with the fluid, or may be added separately.

(14) Asphaltene Inhibitors

The composition may further comprise an asphaltene inhibitor. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

(15) Paraffin Inhibitors

The composition may further comprise a paraffin inhibitor. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylphenolic resins.

(16) Antioxidants

In some embodiments, the composition may further comprise an antioxidant. Any antioxidant suitable in oilfield operations may be used. Exemplary antioxidants include but are not limited to sulfites, thiocyanates and thiosulfates. An antioxidant may be included in a composition in an amount of about 1 ppm to about 1000 ppm, e.g., 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, or 1000 ppm.

c. Foam Testing Methods

Foaming agents can be evaluated using a variety of test methods. Generally, two methods have been used to evaluate the foaming efficacy of the foaming agents: blender tests (ASTM D-3519-88) and a modified ASTM-D-892 test method.

In the blender test, a set volume of brine (produced or synthetic) is treated with a foaming agent. The typical volume used in the test is 100-200 mL. The treated brine can be subjected to a high shear rate for 30-60 sec. A shear rate of 3,000-14,000 rpm is recommended. After 30-60 sec, the blender may be turned off and the foam height measured in mm or mL. The time to defoam one-half of the initial charge is recorded as the foam half-life. Typical test times are 5-10 minutes.

In the modified D-892 Test, gas is used to create foam instead of mechanical shearing. To simulate gas production, a gas rich in methane can be used instead of an inert gas or air. The flow rate of the methane-rich gas is typically maintained at a rate of 0.25 to 1.0 L/min using a calibrated flowmeter. Tests can be conducted in a cylinder, such as one with a capacity of 700 or 1,000 mL. Test volumes can vary with 100 mL of brine being a common charge. For tests at temperatures above or below ambient temperature, ±25° C., a jacketed column can be used. The temperature inside the jacketed column can be maintained at 0-100° C.±1° C. using a circulating water bath.

In the modified D-892 test, foam height in mL can recorded at various intervals. The column can also be fitted with an overflow device that allows for the determination of liquid overflow during a test. Liquid overflow is determined in mL at the end of the test period. The typical test time is 10 to 30 min. At the end of the test the foam height after overflow and the foam half-life are determined. In a further modification of the D-892 test, the overflow can be tracked.

Methanol or ethanol can be included in the modified D-892 test method to evaluate the performance of foamers in the presence of such low-molecular weight alcohols.

The present invention has multiple aspects, illustrated by the following non-limiting examples.

3. EXAMPLES

Example 1

Solubilities of Fluorosurfactants in Methanol

To be an effective foaming agent for methanol, a compound should be soluble in methanol to ensure effective adsorption onto the gas/methanol or gas/alcohol containing liquid interface. In each case, 1 wt. % agent was added to methanol, the mixture was agitated, and the solution was visually inspected for solids and precipitation, which are signs of a lack of solubility.

Table 1 illustrates the solubilities of various fluorosurfactants or surfactants in methanol. Surfactant 1 is a compound of formula (I) wherein R is —CH$_2$CH$_2$—(CF$_2$CF$_2$)$_x$—CF$_2$CF$_3$, each x is independently 8 to 18, and Cat is NH$_2$(CH$_2$CH$_2$OH)$_2$$^+$. Surfactant 2 has the following structure, wherein x is 1 to 8.

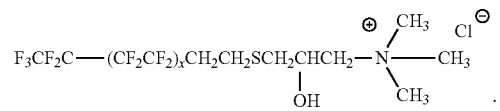

Surfactant 3 has the following structure, wherein x is about 1 to 8 and y is about 1 to 8:

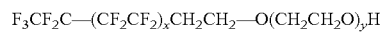

Surfactant 4 is ethoxylated C11-14-ISO—, C13-rich alcohols.

TABLE 1

Fluorosurfactants and Surfactants Solubility in Methanol

| Surfactant | Class | Soluble in methanol? |
|---|---|---|
| Surfactant 1 | Fluoroaliphatic phosphate ester | Yes |
| Surfactant 2 | Fluoroaliphatic quaternary compound | Yes |
| Surfactant 3 | Fluoroaliphatic polyoxyethylene fluorosurfactant | Yes |
| Surfactant 4 | Ethoxylated alcohols | Yes |

Example 2

Liquid Unloading Efficiencies

The unloading efficiency of foamers can be evaluated using a laboratory dynamic foaming test apparatus. This provides a means to screen foamers under various conditions and rank performance. The dynamic foaming test uses a liquid sample that contains methanol, with or without presence of the following: synthetic brine or field brine, field condensate or crude oil. The sample is then dosed with the desired treat rate of a foaming agent (weight based dosage of the active foaming compound). The total test fluid is slowly poured into a 1000 mL column at the bottom of which nitrogen gas (7 LPM) sparges through a frit glass. The gas flow generates the foam and unloading occurs.

Following the test, the liquid unloading efficiency is calculated by dividing the weight of the liquid removed from the column after 15 min by 100 g. Several fluorinated compounds including fluoroaliphatic phosphate ester (Surfactant 1), a fluoroaliphatic quaternary compound (Surfactant 2), a fluoroaliphatic polyoxyethylene fluorosurfactant (Surfactant 3), as well as conventional foamers such as ethoxylated alcohols (ethoxylated C11-14-ISO—, C13-rich alcohols), a best-in-class aqueous foamer (cocamidopropyl betaine) and a best-in-class oil foamer (a blend of lauroyl amide hydroxy sulfobetaine and alpha olefin sulfonate) were tested. Test results are illustrated in Table 2.

TABLE 2

Fluorosurfactant and Surfactants Solubility in Methanol

| Surfactant | Active Dose | Unloading Efficiency (wt. %) |
|---|---|---|
| Surfactant 1 | 1 wt. % | 50.14 |
| Surfactant 1 | 5000 ppm | 28.37 |
| Surfactant 2 | 1 wt. % | 0 |
| Surfactant 3 | 1 wt. % | 0 |
| Surfactant 4 | 15 wt. % | 26.34 |
| Surfactant 4 | 5000 ppm | 0 |
| Cocamidopropyl betaine | 1 wt. % | 0 |
| Blend of Lauroylamide Hydroxy Sulfobetaine and Alpha olefin sulfonate | 1 wt. % | 0 |

Surfactant 1, which is a compound of formula (I) described herein shows excellent performance in unloading liquids consisting of 100% methanol, at a low dose rate of 1 wt. % and even at 500 ppm. While other fluorinated compounds achieved minimum or no liquid unloading, ethoxylated alcohols at high dosage of 15 wt % unloaded 26.34%, which is similar to the unloading efficiency of Surfactant 1 at 5000 ppm. The best-in-class aqueous foamer and the best-in-class oil foamer did not generate any foam under the test conditions, thus didn't generate any methanol unloading.

Ethoxylated alcohols achieved limited liquid unloading efficiency even at very high dosages. The fluorinated cationic Surfactant 2 and fluorinated nonionic Surfactant 3 also did not yield any foam unloading.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A method of removing a low molecular weight alcohol or alcohol-containing fluid during oil or gas production, comprising:
   introducing into a wellbore or a pipeline containing the low molecular weight alcohol or alcohol-containing fluid a composition comprising an effective amount of a compound of formula (I):

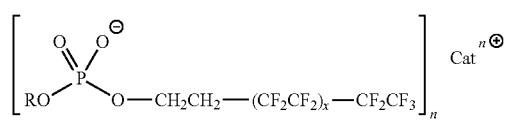

wherein:
R is hydrogen or $-CH_2CH_2-(CF_2CF_2)_x-CF_2CF_3$;
each x is independently an integer from 1 to 50;
n is 1 or 2;
Cat is a cation selected from the group consisting of betaine, $N(R^a)_4^\oplus$, an alkali metal cation and an alkaline earth metal cation, wherein each $R^a$ is independently hydrogen or optionally substituted $C_1$-$C_6$ alkyl; and
removing the low molecular weight alcohol or alcohol-containing fluid from the wellbore or the pipeline.

2. The method of claim 1, wherein the composition further comprises a solvent.

3. The method of claim 2, wherein the solvent is selected from the group consisting of water, a $C_1$-$C_6$ alcohol, a glycol, a glycol ether and xylenes.

4. The method of claim 1, wherein the composition further comprises an additive selected from the group consisting of corrosion inhibitors, scale inhibitors, biocides, paraffin dispersants and emulsion breakers.

5. The method of claim 1, wherein the composition further comprises a surfactant selected from the group consisting of siloxanes, sulfobetaine fluorocarbons, amine oxide fluorocarbons, ethoxylated nonylphenol type fluorocarbons, ethoxylated alcohol type fluorocarbons, fluoropolymers, betaines, amine oxides, ethoxylated nonylphenols, ethoxylated alcohol olefin sulfonates and ether sulfonates.

6. The method of claim 1, wherein the composition comprises about 10 ppm to about 100,000 ppm of the compound of formula (I).

7. The method of claim 1, further comprising introducing the composition into the wellbore or pipeline as batch addition.

8. The method of claim 1, comprising continuously introducing the composition into the wellbore or pipeline.

9. A method of recovering a hydrocarbon fluid from a well, comprising:
   introducing into the well containing the hydrocarbon a composition comprising an effective foam-forming amount of a compound of formula (I):

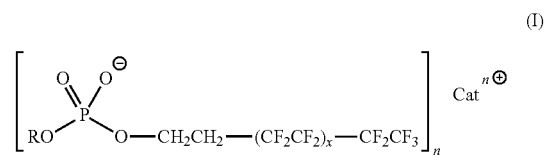

wherein:
R is $-CH_2CH_2-(CF_2CF_2)_x-CF_2CF_3$;
each x is independently an integer from 8 to 50;
n is 1 or 2;
Cat is a cation selected from the group consisting of betaine, $N(R_a)_4^\oplus$, an alkali metal cation and an alkaline earth metal cation, wherein each $R^a$ is independently hydrogen or optionally substituted $C_1$-$C_6$ alkyl; and
removing the hydrocarbon from the well.

10. The method of claim 9, wherein the hydrocarbon fluid is a naturally present liquid in a gas well.

11. The method of claim 10, further comprising recovering the gas from the gas well.

12. The method of claim 9, wherein the hydrocarbon fluid is crude oil and the well is a gas-lifted oil well.

13. A method, comprising:
introducing into a wellbore or a pipeline a composition comprising an effective amount of a compound of formula (I):

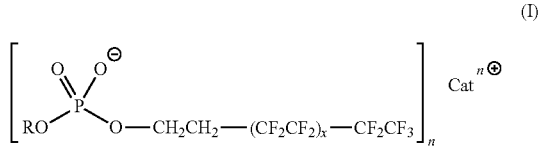

wherein:
R is —$CH_2CH_2$—$(CF_2CF_2)_x$—$CF_2CF_3$;
each x is independently an integer from 8 to 50;
n is 1 or 2;
Cat is a cation selected from the group consisting of betaine, $N(R^a)_4^{\oplus}$, an alkali metal cation and an alkaline earth metal cation, wherein each $R^a$ is independently hydrogen or optionally substituted $C_1$-$C_6$ alkyl, wherein at least one $R^a$ is optionally substituted $C_1$-$C_6$ alkyl.

14. The method of claim 13, wherein the composition further comprises a solvent.

15. The method of claim 14, wherein the solvent is selected from the group consisting of water, a $C_1$-$C_6$ alcohol, a glycol, a glycol ether and xylenes.

16. The method of claim 13, wherein the composition further comprises an additive selected from the group consisting of corrosion inhibitors, scale inhibitors, biocides, paraffin dispersants and emulsion breakers.

17. The method of claim 13, wherein the composition further comprises a surfactant selected from the group consisting of siloxanes, sulfobetaine fluorocarbons, amine oxide fluorocarbons, ethoxylated nonylphenol type fluorocarbons, ethoxylated alcohol type fluorocarbons, fluoropolymers, betaines, amine oxides, ethoxylated nonylphenols, ethoxylated alcohol olefin sulfonates and ether sulfonates.

18. The method of claim 13, wherein the composition comprises about 10 ppm to about 100,000 ppm of the compound of formula (I).

19. The method of claim 13, further comprising introducing the composition into the wellbore or pipeline as batch addition.

20. The method of claim 13, wherein the composition comprises a gas hydrate inhibitor.

* * * * *